United States Patent [19]
Bachmann et al.

[11] Patent Number: 5,567,918
[45] Date of Patent: Oct. 22, 1996

[54] METHOD AND APPARATUS FOR INITIATING A WEIGHING OPERATION

[75] Inventors: Rudolf Bachmann, Bertschikon; Beat Hartmann, Effretikon, both of Switzerland

[73] Assignee: Mettler-Toledo AG, Greifensee, Switzerland

[21] Appl. No.: 200,439

[22] Filed: Feb. 23, 1994

[30] Foreign Application Priority Data

Feb. 26, 1993 [CH] Switzerland ............... 590/93

[51] Int. Cl.$^6$ ................. G01G 19/22; G01G 19/52
[52] U.S. Cl. ................ 177/25.13; 177/50; 364/567
[58] Field of Search ................. 177/25.11, 25.13, 177/50; 73/1 B; 364/567

[56] References Cited

U.S. PATENT DOCUMENTS 4,481,587  11/1984  Daniels, Jr. ............ 364/567 X
4,862,401  8/1989  Kubli et al. ............. 177/25.11 X

FOREIGN PATENT DOCUMENTS 2806091  8/1979  Germany.
3213015  10/1983  Germany.
3638210  5/1988  Germany.
3942311  6/1991  Germany.
8800371  1/1988  WIPO.

Primary Examiner—Brian W. Brown
Assistant Examiner—Randy W. Gibson
Attorney, Agent, or Firm—Laubscher & Laubscher

[57] ABSTRACT

A method and apparatus for initiating a weighing scale operation, including a quick start program operable either by the tare key of the weighing scale or by the application of a load to the load-receiving member of the scale to by-pass a start-up test program, and to connect directly a weighing program to a display, thereby to avoid the display and confirmation of a start-up test program. Upon the reenergization of the signal processing unit following a power failure, the test program is automatically displayed on the display device.

4 Claims, 3 Drawing Sheets

METHOD AND APPARATUS FOR INITIATING A WEIGHING OPERATION

STATEMENT OF THE INVENTION

This invention relates to a method and apparatus for initiating the operation of a weighing scale, including keyboard means for introducing start-up parameters and functions into a signal processing unit. A test program operating means is by-passed either upon the operation of the tare key of the keyboard, or upon the application of a load to the load-receiving member, whereby the weighing signal is displayed directly on the display means. Following the interruption of power, re-energization of the signal processing unit causes the complete test program to be presented on the display means.

BRIEF DESCRIPTION OF THE PRIOR ART

Some of the more recent electronic scales have an alphanumerical display field for displaying the weighing result and additional weighing functions. Such a scale is shown in the German Patent No. DE-A1-3638210 and includes a digital signal processing unit that contains several programs, as well as a display field and a tare key for the electronic zero-setting of the display. The tare key is subdivided into several sections each of which is supported on a separate switching element so that, with software control, either all switching elements trigger the same function (for example, taring), or each switching element triggers a different function. This is possible since the tare key is available for simple weighing programs as a relative wide key that can be operated by the user. Thus, the basic idea of this system is easily, in the course of simple operation, to use the key, normally subdivided into sections, as a tare key over its entire width. Consequently, an additional key is needed to select a different weighing program. After activation of this additional switch-over key, the selection parameters of the other program, selected with the additional key, then appear on the display above the tare key. The individual program points can be activated with the tare key that is now subdivided.

In the German patent No. DE-A1-2806091, a bathroom scale includes a platform which, as it is stepped on, turns on the electric circuit and which, after the person steps off the platform, keeps the scale activated for a given period of time so as to maintain the weighing result visible on the display for a corresponding interval of time. In these known scales, the power supply is turned on by the vertical shift of the platform as the person to be weighed loads that platform. The switch that is activated as the person steps on the scale replaces the manual switch that is usually arranged laterally on the scale by means of which one can turn the scale electronics on and off. Furthermore, the electronics circuitry includes a time delay that delays the turn-off so that the display remains preserved for awhile after the load has been removed from the platform.

The purpose of the present invention, therefore, is to provide a method and a weighing scale that can be started up directly from the standby mode into the previously configured weighing mode.

SUMMARY OF THE INVENTION

Accordingly, a primary object of the present invention is to provide an improved weighing scale method and apparatus, including means operable either by a tare key or by the application of a load to a load-receiving member for bypassing a start-up test program, whereby the weight-responsive reading is directly presented on the display.

According to another object, after the interruption of power to the signal processing unit, the resumption of power causes the complete start-up test program to be displayed directly on the display.

A more specific object of the invention is to provide a weighing scale in which the job of the operator is made easier by by-passing the test displays when turning on the scale by putting on a load to be measured or by working, for example, the tare key. The operator likewise does not have to have any kind of knowledge regarding the way to handle the scale. Automatically running through the complete test program after a power failure and the subsequent confirmation of the correctness of the displays, which is then necessary, will ensure that the scale configuration will then be checked optically in any case.

BRIEF DESCRIPTION OF THE DRAWING

Other objects and advantages of the invention will become apparent from a study of the following specification, when viewed in the light of the accompanying drawing, in which.

DETAILED DESCRIPTION

Figure 1:
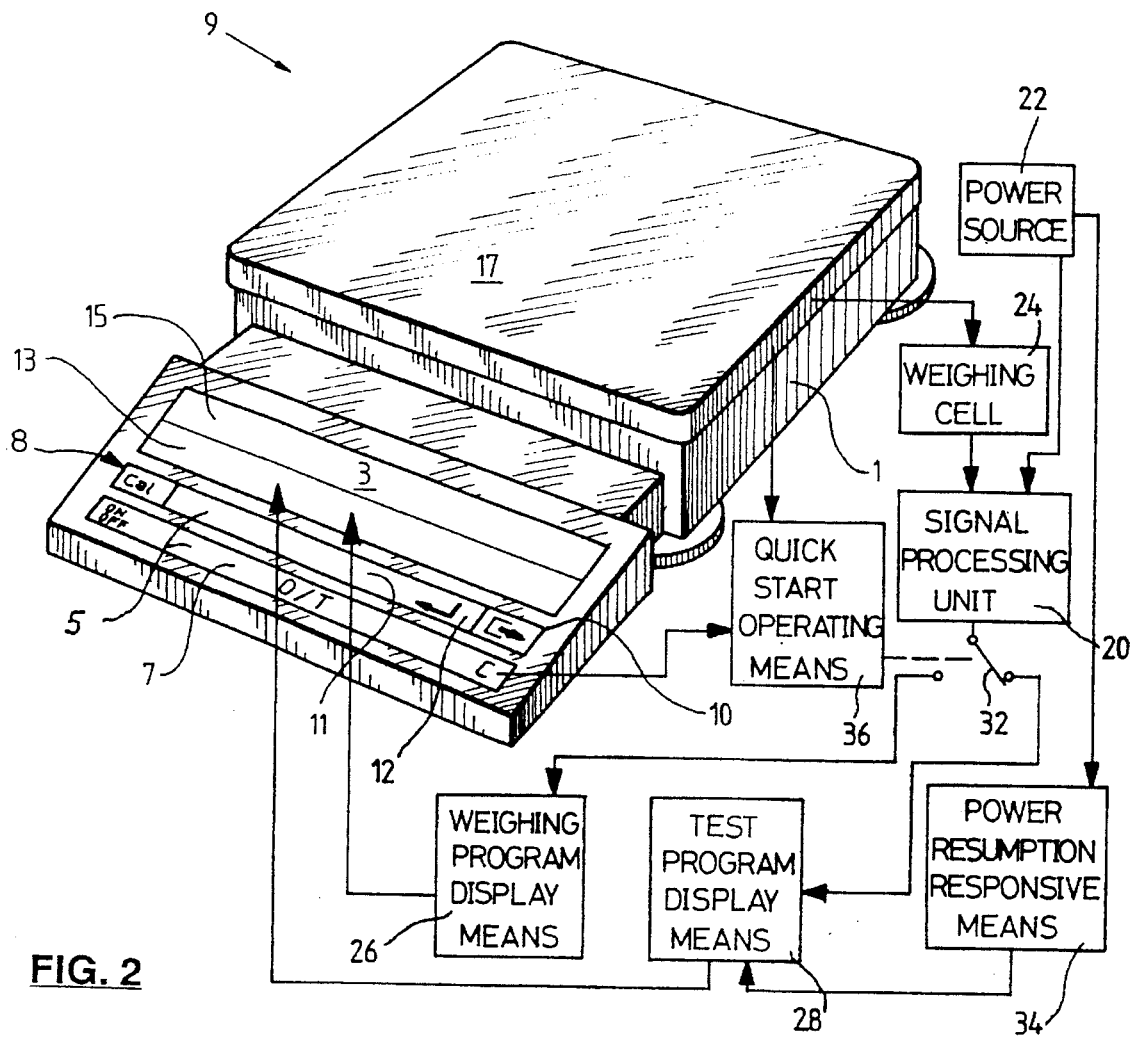
FIG. 1 is a perspective view of the weighing apparatus of the present invention, with the weighing system being illustrated in block diagram form.

Referring first more particularly to FIG. 1, the weighing scale 9 includes a housing 1 having an alphanumerical display field 3 and a keyboard 5 having bar-shaped tare and function keys 7 and 8, respectively. Function key 8 includes a menu key 10, a variable selection key 11, and an enter key 12. Display field 3 is subdivided into a pair of lines 13 and 15. In place of two lines, of course, one could also have a larger number of lines, or a fully-graphic illustration that also permits the display of picto-grams. A flat weighing platform or pan 17 is provided, and if desired, the weighing pan could be mounted within a wind protection housing (not shown).

The weighing scale 9 includes a signal processing unit 20 energized from power source 22, and the signal processing unit has an input supplied with a load-responsive weight signal produced by the weighing cell 24. Initially the signal processing unit 20 effects the running of a start-up test program 28 contained therein, which program is displayed on display screen 3. The signal processing unit then switches over (as illustrated diagrammatically by switch 32) to the weighing mode to display on the display screen 3 the load weight value as processed via weighing program display means 26. In the event that there has been an interruption of the power supply to the signal processing unit 20, upon the resumption of power, the power-resumption-responsive means 34 causes the complete test program to be displayed on screen 3.

In accordance with the present invention, quick start means 36 are operable either by the tare key 7 or by the application of a load to weighing platform 17 to switch the signal processing unit from the test program mode to the weighing program mode (i.e., to effect by-passing of the time-consuming test program).

In operation, in order to "activate" a key, the key is either depressed to overcome a mechanical resistance, or the user touches a key that is made as a softkey or a touchpad or touchpanel. It is assumed that at least selection key 11 is made as a softkey or touchpad and is subdivided into many small sections. In the example shown, the X-coordinate is in the form of a potentiometer contained in key 11 via a resistance layer that is applied on the switching foil. The resolution of the X-coordinate depends on the quality of the resistance layer and the analysis electronics. For example, it can be a maximum of about 0.5 mm, i.e., when key 11 is touched, the analysis electronics recognizes the point of contact with a resolution in the direction of the X-coordinate amounting to at least 0.5 mm. The value determined for the X-coordinate is coordinated with a function that lights up above the contact point in display field 13.

EXAMPLE 1

Figure 2:
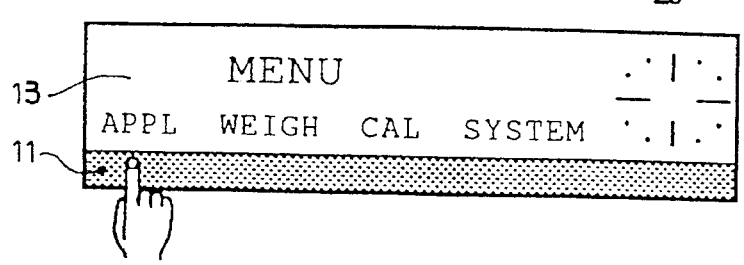
FIG. 2 is a detailed view of the lower display field line and the adjacent menu bar key.

The main menu in display field 13 is displayed for the purpose of selecting and configuring after the scale has ben turned on by activating the "ON" key that can be a part of the tare key 7 and by activating the MENU key 10. The following data will then appear (as shown in FIG. 2):

APPL (application), WEIGH (weight), CAL (calibration), SYSTEM.

The ENTER and PRINTCOMMAND functions are assigned to separate key 12 (FIG. 1), or they can also be displayed in display field 13 and can be activated via MENU key 11.

Figure 3:
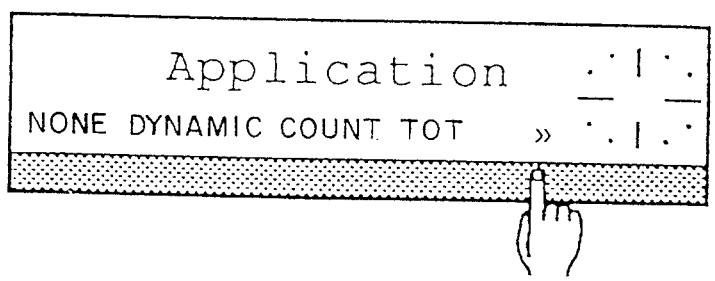
FIG. 3 is a detailed view of the display field line following selection of APPL (application) of the main menu of FIG. 2.
Figure 4:
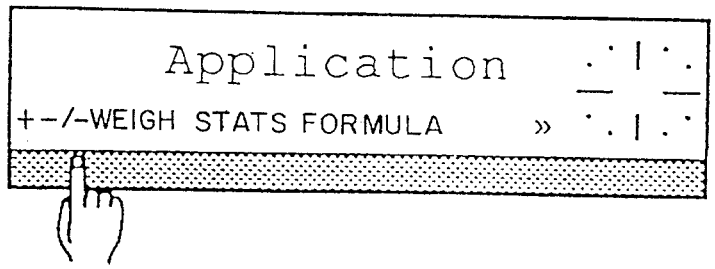
FIG. 4 illustrates the display field after the section of APPL of FIG. 2, and after the activation of the ">>" symbol of FIG. 3.
Figure 5:
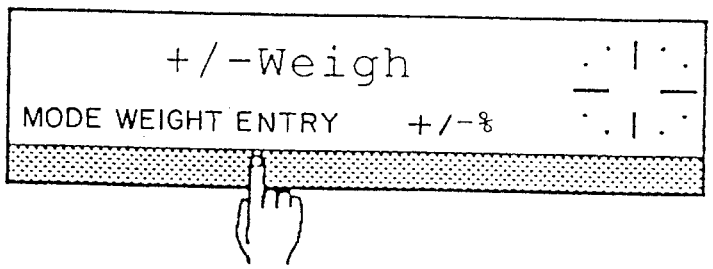
FIG. 5 illustrates the display after the activation of the +/– WEIGHT symbol of FIG. 4.
Figure 6:
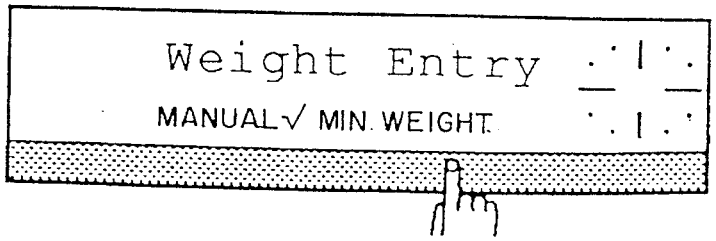
FIG. 6 illustrates the display after the selection of the Weight Entry display of FIG. 5.
Figure 7:
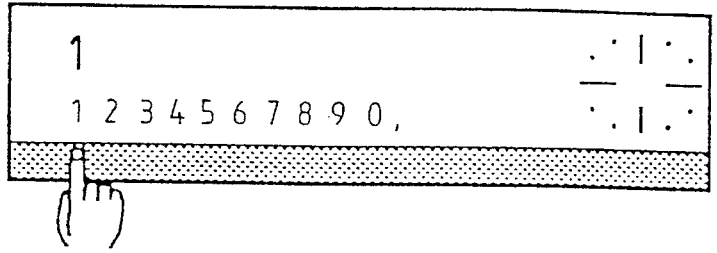
FIG. 7 illustrates the display field resulting from the activation of the designation Min Weight of FIG. 6, and the activation of the "1" numerical position of FIG. 7.
Figure 8:
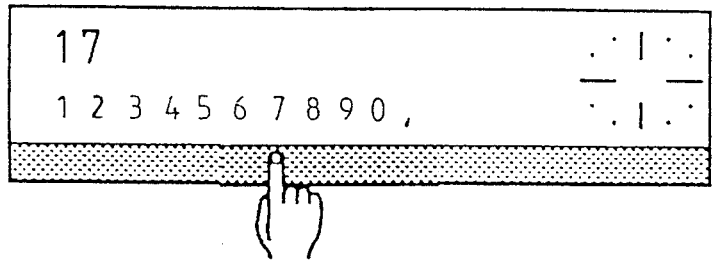
FIG. 8 illustrates the display after the further activation of the "7" numerical position of FIG. 8.

Touching key 11 in the area directly below APPL is interpreted by the scale electronics as a command to make the APPL menu point appear enlarged on display field 15. Now, the subfunctions within the APPL function (FIG. 3) will appear in display field 13. The functions that are possible in the basic APPL operation are illustrated again next to each other and arranged over key 11 in display field 13 and can be selected by activating the key, (i.e., by touching below the desired function). The arrangement of the displays here is not subjected to a fixed matchup as regards the X-coordinate: it can be adapted to the requirements in terms of the space needs of the data in the display field. If not all of the functions can find space next to each other in the display field, this is indicated by the scroll symbol (>>). Touching key 11 below the symbol >> will cause the additional functions to appear in display field 13 (FIG. 4). After marking, for example, of +/− WEIGH, the subfunction of the function +/− WEIGHT will be displayed in display field 13 (FIG. 5). Next, within these functions, one could, for example, select the function WEIGHTENTRY and it could be made visible (FIG. 6). Finally, in the APPL function that has a tree structure, one can now select the function MINWEIGHT and the numbers "1 2 3 4 5 6 7 8 9 0" will then appear in display field 13, once again arranged next to each other, as well as punctuation marks >> and the like, which beforehand, marked individually by key 11 and assembled into a multidigit number only by activating the ENTER key 12, result in a desired minimum weighing value. Any necessary decimal positions can also be inserted by means of key 11.

By activating the MENU key 10 for a longer time, the value that was inputted is stored and now only the selected weighing parameters and functions appear in display field 13. The key section below display field 13, which is then not written on, is inactive during the weighing procedure. The weight display is given numerically in the upper display field 15 and, behind it, comes the unit of weight (kg, g, oz, etc.). An alternate weight unit can be displayed and selected by activating key 11, provided it has first been determined beforehand in the WEIGHT mode.

EXAMPLE 2

Figure 9:
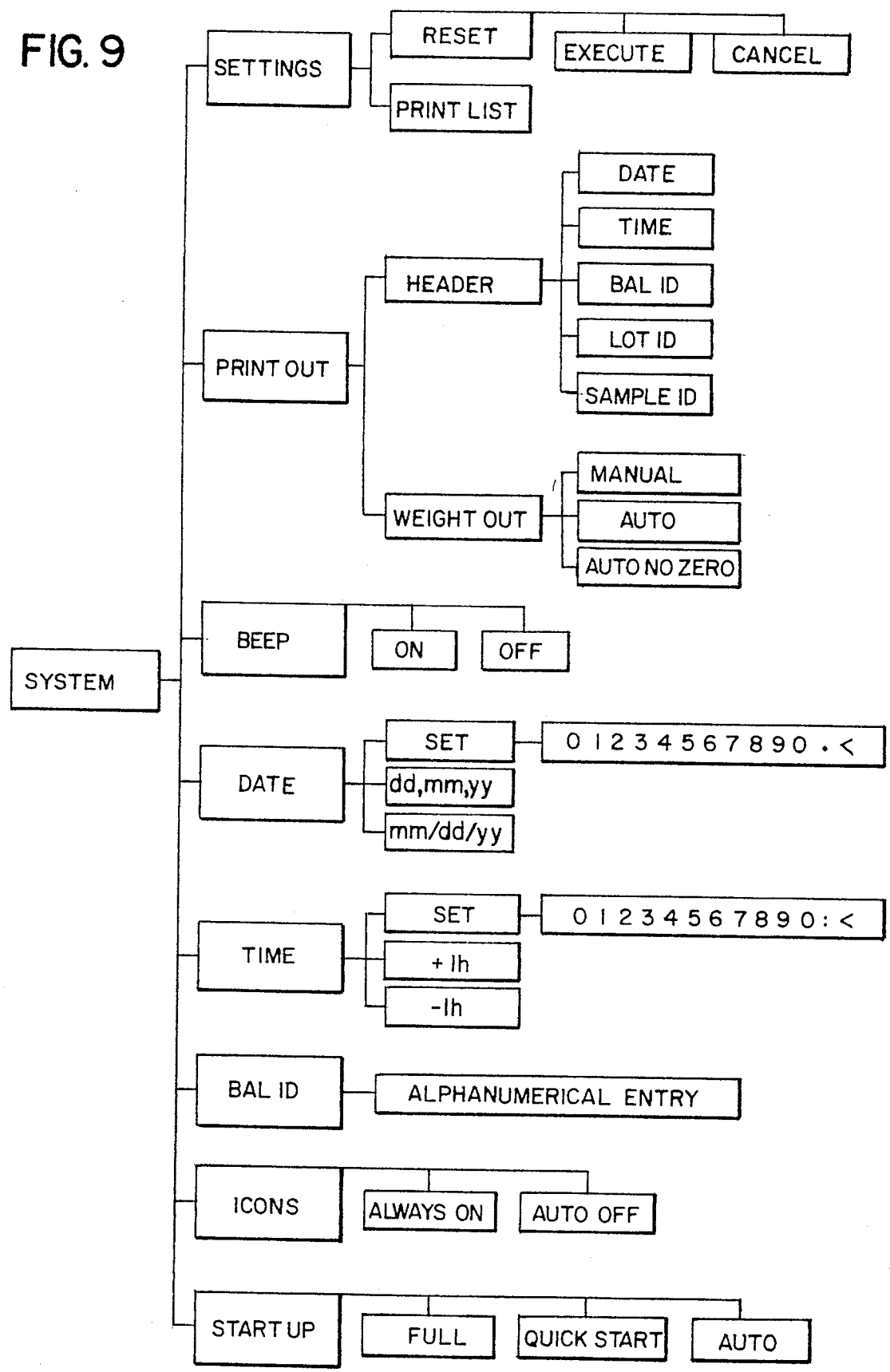
FIG. 9 is a structure diagram of the SYSTEM mode.

The scale electronics interprets a touching of menu key 11 directly below SYSTEM in the main menu as the command to have the SYSTEM menu appear next in display field 13. FIG. 9 illustrates the entire SYSTEM tree. The particular callable levels within the SYSTEM mode are illustrated schematically in that tree. This figure replaces the individual display modes such as they are illustrated in FIGS. 1 to 8 for application (APPL). The functions that are possible in the basic SYSTEM operation again are arranged next to each other and directly over selection key 11 in display field 13 and can be recalled by activating the key, that is to say, by touching it below the desired function.

The scale electronics will interpret the additional touching of key 11 in the SYSTEM mode directly underneath STARTUP as another command to have the STARTUP menu point next appear in display field 13 (FIG. 9). The functions (FULL, QUICKSTART, AUTO) that are possible in the basic STARTUP operation are again set up next to each other and arranged directly over key 11 in display field 13 and can be selected by activating the key, i.e., by touching it below the desired function. Thus, considerably more space is available on the key in the X-direction for the selection of these functions than in the preceding example, because only three alternatives are displayed here.

After touching key 11 below FULL, the FULL mode is now activated. A mark or illustration contrast on the display will optically display the selected mode after the key has been touched. To preserve this mode, menu key 10 is pressed for a relatively long time.

In the scale electronics, the usual STARTUP procedure is activated after the tare key 7 has been touched in the STANDBY mode, i.e., lamp test, model name, and display "0.00 g" are activated. The operator thus can perform the predetermined optical checks (which are specific for the particular scale) before the first weighing operation is performed and must moreover confirm these checks. This "manual" startup is state of the art.

By marking QUICKSTART and by confirmation with the help of key 10, one can, in accordance with the present invention, activate a modified start-up procedure. Using that modified start-up, the scale is started up without prior lamp test, indication of model name, etc., and this time no confirmation is required. By activating the TARE key or by adding to the load receiver 17 a weight with a predetermined minimum value, one can immediately observe the weight data corresponding with the weight of the applied load.

The third possibility is to activate the "AUTO" mode. The latter facilitates the fully automatic startup of the scale after a power supply interruption has been triggered.

After the selection of FULL, QUICKSTART, or AUTO, the subordinate menu will once again show up in the display, unless one tries to get back directly into the main menu by repeated depression of the bar key.

While in accordance with the Patent Statutes the preferred form and embodiments of the invention have been illustrated and described, it will be apparent to those skilled in the art that changes may be made without deviating from the inventive concepts set forth above.

What is claimed is:

1. A method for initiating the operation of a weighing scale (9) having a housing (1), a load-receiving member (17) connected for movement relative to said housing, weighing cell means (24) responsive to the application of a load to said load-receiving member for generating a weighing signal as a function of the magnitude of said load, a signal processing unit (20) for processing said weighing signal, a keyboard (5) for entering start-up parameters and functions into said signal processing unit, said keyboard having a tare key member (7), and alphanumeric display means (3) operable by said signal processing unit to display initially a test menu display when said signal processing unit is in a first condition, and to subsequently display a load-responsive display when said signal processing unit is in a second condition, said method including the step of:

selectively operating one of said tare key (7) and load-receiving members (17) to switch said signal processing unit from said first condition to said second condition.

2. A method as defined in claim 1, wherein said weighing scale includes a power source (22) for energizing said signal processing unit; and further including the step of:

automatically running through the test program, after the interruption of power to said signal processing unit, upon the resumption of power to said signal processing unit, said signal processing unit being switched to the weighing program only after completion of the test displays.

3. An electronic weighing scale, comprising:

(a) a housing (1);

(b) a load-receiving member (17) connected for movement relative to said housing;

(c) weighing cell means (24) for generating a weighing signal as a function of the load applied to said load-receiving member;

(d) a digital signal processing unit (20) containing a start-up test program (26) and a weighing program (28);

(e) alphanumeric display means (3) for displaying weight values corresponding with said weighing signal, and for displaying said start-up test program;

(f) keyboard means (5) for selecting and configuring a start-up test program for said weighing scale, said keyboard means including a tare key member (7) for electronically setting the display means to zero;

(g) said digital signal processing unit containing quick-start program means (32, 36) operable to by-pass said start-up test program, and responsive to the selective operation of one of said platform and tare key members for operating said quick-start program to by-pass said start-up test program and to effect operation of the normal scale weighing program.

4. Apparatus as defined in claim 3, and further including a power source (22) for energizing said signal processing unit, and power resumption responsive means (34) operable, after a power interruption condition, upon the resumption of power to said signal processing unit to effect display of the entire start-up program on said display means.

* * * * *